United States Patent
Okayama et al.

(10) Patent No.: US 8,104,558 B2
(45) Date of Patent: Jan. 31, 2012

(54) VEHICLE CONTROLLER

(75) Inventors: Hideo Okayama, Chiyoda-ku (JP);
Yoshinobu Koji, Chiyoda-ku (JP);
Kiyonobu Ueda, Chiyoda-ku (JP);
Yasuhisa Adachi, Tanba (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 474 days.

(21) Appl. No.: 12/299,914

(22) PCT Filed: Jan. 26, 2007

(86) PCT No.: PCT/JP2007/051264
§ 371 (c)(1),
(2), (4) Date: Nov. 7, 2008

(87) PCT Pub. No.: WO2007/138759
PCT Pub. Date: Dec. 6, 2007

(65) Prior Publication Data
US 2009/0101419 A1    Apr. 23, 2009

(30) Foreign Application Priority Data
May 25, 2006  (WO) .................. PCT/JP2006/310463

(51) Int. Cl.
  *B60K 1/00*  (2006.01)
(52) U.S. Cl. .................. 180/65.8; 180/65.265
(58) Field of Classification Search ............... 180/65.1, 180/65.235, 65.27, 65.28, 65.285, 65.8, 65.265; 323/282, 351; 701/22, 29; 307/10.1, 36, 307/155; 340/438, 468, 475, 3.1, 459
See application file for complete search history.

(56) References Cited

U.S. PATENT DOCUMENTS

| | | | | |
|---|---|---|---|---|
| 3,564,280 A | * | 2/1971 | Sognefest et al. | 307/155 |
| 3,651,454 A | * | 3/1972 | Venema et al. | 340/459 |
| 5,508,689 A | * | 4/1996 | Rado et al. | 340/3.1 |
| 5,736,925 A | * | 4/1998 | Knauff et al. | 340/468 |
| 5,880,674 A | * | 3/1999 | Ufkes et al. | 340/438 |
| 6,127,741 A | * | 10/2000 | Matsuda et al. | 307/36 |
| 6,268,794 B1 | * | 7/2001 | Tzanev | 340/475 |

(Continued)

FOREIGN PATENT DOCUMENTS
JP        62-299474 A       12/1987
(Continued)

OTHER PUBLICATIONS

Notice of Reasons for Refusal issued in the corresponding Japanese Patent Application No. 2007-529285 dated Jan. 5, 2010, and an English Translation thereof.

(Continued)

*Primary Examiner* — Hau Phan
(74) *Attorney, Agent, or Firm* — Buchanan Ingersoll & Rooney PC

(57) ABSTRACT

A vehicle controller is mounted in a box-shaped manner beneath the floor or on the roof of a vehicle so as to supply electric power to vehicle apparatuses. The vehicle controller is configured with a plurality of functional modules; each of the functional modules has at one side thereof an interface side in which a first interface region where signal-line terminals are arranged and a second interface region where power-line terminals are arranged are separated; in each of the interface sides, the first interface region is disposed at one and the same end and the second interface region is disposed at the other and the same end.

27 Claims, 11 Drawing Sheets

U.S. PATENT DOCUMENTS

| | | | |
|---|---|---|---|
| 6,420,799 B1 * | 7/2002 | Sakamoto et al. | 307/10.1 |
| 6,479,973 B2 * | 11/2002 | Saito et al. | 323/282 |
| 6,900,555 B2 * | 5/2005 | Sakamoto et al. | 307/10.1 |
| 7,023,150 B2 * | 4/2006 | Hisada et al. | 180/65.1 |
| 7,038,657 B2 * | 5/2006 | Rosenberg et al. | 345/156 |
| 7,451,025 B2 * | 11/2008 | Kojima et al. | 701/29 |
| 2004/0124332 A1 * | 7/2004 | Takenaka et al. | 248/648 |
| 2005/0285581 A1 * | 12/2005 | Hayakawa | 323/282 |

FOREIGN PATENT DOCUMENTS

| | | |
|---|---|---|
| JP | 5-115101 A | 5/1993 |
| JP | 5-199601 A | 8/1993 |
| JP | 6-144218 A | 5/1994 |
| JP | 06-153329 | 5/1994 |
| JP | 7-017396 A | 1/1995 |
| JP | 09-037414 | 2/1997 |
| JP | 10-278784 A | 10/1998 |
| JP | 11-145632 A | 5/1999 |
| JP | 2000-211504 A | 8/2000 |
| JP | 2000-302034 A | 10/2000 |
| JP | 2001-258263 A | 9/2001 |
| JP | 2003-095088 | 4/2003 |
| JP | 2004-299469 A | 10/2004 |
| JP | 2005-033885 A | 2/2005 |

OTHER PUBLICATIONS

Office Action dated May 25, 2010 issued in the corresponding Japanese Patent Application No. 2007-529285, and an English Translation of the main portion of the Office Action thereof.

Form PCT/ISA/210 (International Search Report) dated May 15, 2007.

* cited by examiner

VEHICLE CONTROLLER

TECHNICAL FIELD

The present invention relates to a vehicle controller that is mounted, for example, in a box-shaped manner beneath the floor or on the roof of a vehicle, and supplies electric power to vehicle apparatuses or the like.

BACKGROUND ART

Vehicle apparatuses mounted beneath the floor of a vehicle have been disclosed, e.g., in Patent Document 1 and Patent Document 3. Vehicle apparatuses mounted in a box-shaped manner on the roof of a vehicle have been disclosed, e.g., in Patent Document 2.

[Patent Document 1] Japanese Patent Laid-Open Pub. No. 2001-258263 (FIG. 3)

[Patent Document 2] Japanese Patent Laid-Open Pub. No. 1995-17396 (FIG. 3)

[Patent Document 3] Japanese Patent Laid-Open Pub. No. 1993-199601 (FIGS. 1 and 2)

DISCLOSURE OF THE INVENTION

Problems to be Solved by the Invention

In a conventional technology disclosed in Patent Document 1, although the arrangement of main components incorporated in a case are described, the arrangement relationship among signal lines and power lines that are electrically connected with the components is scarcely described. In general, signal lines and power lines for connecting components are randomly wired in practice. Accordingly, there has been a problem that mounting components on or dismounting components from the case is not readily performed, whereby maintenance and inspection are not simply performed. Additionally, because signal lines and power lines are randomly wired, the paths of electromagnetic noise caused by semiconductor switches become complex; therefore, there has been a problem that it is difficult to select components in conformity with EMC (electromagnetic compatibility) standards.

As a vehicle controller in which these problems are improved to some extent, Patent Document 3 discloses a vehicle controller in which signal lines and power lines are separately arranged. FIG. 11 is a cross-sectional view of a conventional vehicle controller disclosed in Patent Document 3. An upper case 31 is fixed beneath the floor of a vehicle 30 in such a way as to be mounted with suspenders 40; a lower case 32 is fixed and mounted to the upper case 31. A built-in apparatus unit 33, which is a main component of the controller, is incorporated in the lower case 32. An inspection cover 34 is provided in an openable and closable manner at one side of the lower case 32. An inspection cover 35 is provided in an openable and closable manner at the other side of the lower case 32. A power-line screw 36 is provided at one side of the built-in apparatus unit 33; power lines 37 connected with the power-line screw 36 are wired in the upper case 31.

A signal-line connector 38 for the built-in apparatus unit 33 is provided at the other side of the built-in apparatus unit 33; signal lines 39 connected with the signal-line connector 38 are wired in the upper case 31. The group of power lines 37 and the group of signal lines 39 are arranged apart from each other in the upper case 31. Even in the case of the controller disclosed in Patent Document 3, when the built-in apparatus unit 33 is mounted or dismounted, work not only at one side but also at the other side is required; therefore, there has been a problem that dismounting, maintenance, and inspection are not simply performed, and in particular, there has been a problem that it takes a long time to make urgent repairs. Moreover, because the power lines 37 are arranged at one side and the signal lines 39 are arranged at the other side, mounting or dismounting of the built-in apparatus unit 33 is performed with low working efficiency from the bottom side of the case; thus, there has been a problem that mounting or dismounting of the built-in apparatus unit 33 is not readily performed.

The present invention has been implemented in consideration of the foregoing problems; the objective thereof is to provide a vehicle controller that can simplify assembling and dismounting of the controller, and can rationalize maintenance and inspection work for maintaining the performance of the controller for a long time.

Means for Solving the Problems

A vehicle controller according to the present invention is provided with a plurality of functional modules and signal lines and power lines connected with the functional modules; one of the sides of the functional modules is an interface side provided with signal-line terminals to which the signal lines are connected and power-line terminals to which the power lines are connected; each of the interface sides is divided into a first interface region where signal-line terminals to which the signal lines are connected are disposed and a second interface region where power-line terminals to which the power lines are connected are disposed; the plurality of functional modules is arranged in such a way that the respective interface sides thereof are adjacent to one another and oriented in the same direction; in each of the interface sides, the first interface region is disposed in the vicinity of one and the same end; the signal lines and the power lines can be attached or detached from one side.

A vehicle controller according to the present invention is provided with a plurality of functional modules and signal lines and power lines connected with the functional modules; each one of the sides of the functional modules is an interface side provided with signal-line terminals to which the signal lines are connected and power-line terminals to which the power lines are connected; each of the interface sides is divided into a first interface region where signal-line terminals to which the signal lines are connected are disposed and a second interface region where power-line terminals to which the power lines are connected are disposed; the plurality of functional modules is divided into two groups and arranged in two rows; the respective interface sides of each group are disposed in such a way as to be adjacent to one another and to be oriented in the same direction, and the interface sides of one of the two groups are arranged in such a way as to face the interface sides of the other group; each of the interface sides of the one group and the other group are disposed in such a way that the respective first interface regions are arranged in the vicinity of one and the same end and the respective second interface regions are arranged in the vicinity of the other and the same end; for each of the groups, the signal lines and the power lines can be attached or detached from one side.

A vehicle controller according to the present invention is provided with a plurality of functional modules and signal lines and power lines connected with the functional modules; one of the sides of the functional modules is an interface side provided with signal-line terminals to which the signal lines are connected and power-line terminals to which the power lines are connected; each of the interface sides is divided into a first interface region where signal-line terminals to which the signal lines are connected are disposed and a second interface region where power-line terminals to which the power lines are connected are disposed; the plurality of functional modules is divided into two groups and arranged in two rows; the plurality of functional modules is arranged in such a way that the respective interface sides thereof are adjacent to one another and oriented in the same direction; one group of the interface sides and the other group of interface sides are arranged in such a way as to be oriented in the same direction; in each of the respective interface sides of the one group and the other group, one of the interface regions is disposed proximally from the middle of the rows and the other interface region is disposed distally from the middle of the rows; for each of the groups, the signal lines and the power lines can be attached or detached from one side.

The plurality of functional modules is divided into a functional module having a switch circuit that performs electrical connection with and disconnection from a DC overhead line, a functional module having a charging and discharging circuit that performs charging and discharging with a DC voltage, a functional module having an inverter that converts a DC voltage into an AC voltage, and a functional module having a contactor that performs electrical connection with and disconnection from a load, and the divided functional modules are connected in order of description and utilized as an auxiliary power source apparatus.

A vehicle controller according to the present invention is configured in such a way that, in each of the functional modules, the respective numbers or the respective pair numbers of input power lines and output power lines other than power lines whose electric potentials are equal to the electric potential of the overhead line or the ground are only one.

ADVANTAGES OF THE INVENTION

In a vehicle controller according to the present invention, one of the sides of the functional modules is an interface side provided with signal-line terminals to which the signal lines are connected and power-line terminals to which the power lines are connected; each of the interface sides is divided into a first interface region where signal-line terminals to which the signal lines are connected are disposed and a second interface region where power-line terminals to which the power lines are connected are disposed; the plurality of functional modules is arranged in such a way that the respective interface sides thereof are adjacent to one another and oriented in the same direction; in each of the interface sides, the first interface region is disposed in the vicinity of one and the same end thereof and the second interface region is disposed in the vicinity of the other and the same end; the signal lines and the power lines can be attached or detached from one side. As a result, wiring paths are simplified and wiring work is simplified; thus, assembling and dismounting work for the controller can be simplified, and maintenance and inspection work for maintaining the performance of the controller for a long time can be rationalized. In particular, attaching and detaching of the power lines and the signal lines that are connected to the functional modules are performed from one side and thereby rationalized.

In a vehicle controller according to the present invention, one of the sides of the functional modules is an interface side provided with signal-line terminals to which the signal lines are connected and power-line terminals to which the power lines are connected; each of the interface sides is divided into a first interface region where signal-line terminals to which the signal lines are connected are disposed and a second interface region where power-line terminals to which the power lines are connected are disposed; the plurality of functional modules is divided into two groups and arranged in two rows; the plurality of functional modules is arranged in such a way that the respective interface sides thereof are adjacent to one another and oriented in the same direction; one group of the interface sides and the other group of interface sides are arranged in such a way as to face each other; each of the interface sides of the one group and the other group are disposed in such a way that the respective first interface regions are arranged in the vicinity of one and the same end and the respective second interface regions are arranged in the vicinity of the other and the same end; for each of the groups, the signal lines and the power lines can be attached or detached from one side. As a result, wiring work is simplified; thus, assembling and dismounting work for the controller can be simplified, and maintenance and inspection work for maintaining the performance of the controller for a long time can be rationalized. In particular, attaching and detaching of the power lines and the signal lines that are connected to the functional modules of each group are performed from one side and thereby rationalized.

In a vehicle controller according to the present invention, one of the sides of the functional modules is an interface side provided with signal-line terminals to which the signal lines are connected and power-line terminals to which the power lines are connected; each of the interface sides is divided into a first interface region where signal-line terminals to which the signal lines are connected are disposed and a second interface region where power-line terminals to which the power lines are connected are disposed; the plurality of functional modules is divided into two groups and arranged in two rows; the plurality of functional modules is arranged in such a way that the respective interface sides thereof are adjacent to one another and oriented in the same direction; one group of the interface sides and the other group of interface sides are arranged in such a way as to be oriented in the same direction; in each of the respective interface sides of the one group and the other group, one of the interface regions is disposed proximally from the middle of the rows and the other interface region is disposed distally from the middle of the rows; for each of the groups, the signal lines and the power lines can be attached or detached from one side. As a result, wiring work is simplified; thus, assembling and dismounting work for the controller can be simplified, and maintenance and inspection work for maintaining the performance of the controller for a long time can be rationalized. In particular, attaching and detaching of the power lines and the signal lines that are connected to the functional modules of each group are performed from one side and thereby rationalized.

A vehicle controller utilized as an auxiliary power source apparatus is divided into a functional module having a switch circuit, a functional module having a charging and discharging circuit, a functional module having an inverter, and a functional module having a contactor, and the divided functional modules are connected in order of description. As a result, not only maintenance and inspection can be performed function by function and thereby rapidly, but also apparatuses that are main sources of electromagnetic noise are put together in a functional module having an inverter; therefore, EMC measures can effectively be carried out.

Moreover, in each of the functional modules, the respective numbers or the respective pair numbers of input power lines and output power lines other than power lines whose electric potentials are equal to the electric potential of the overhead line or the ground are only one. As a result, in the case where there occurs a trouble in a certain functional module in the vehicle controller, inspection and replacement can readily be carried out in a short time, whereby the controller can rapidly be restored.

BEST MODE FOR CARRYING OUT THE INVENTION

Embodiment 1

Figure 1:
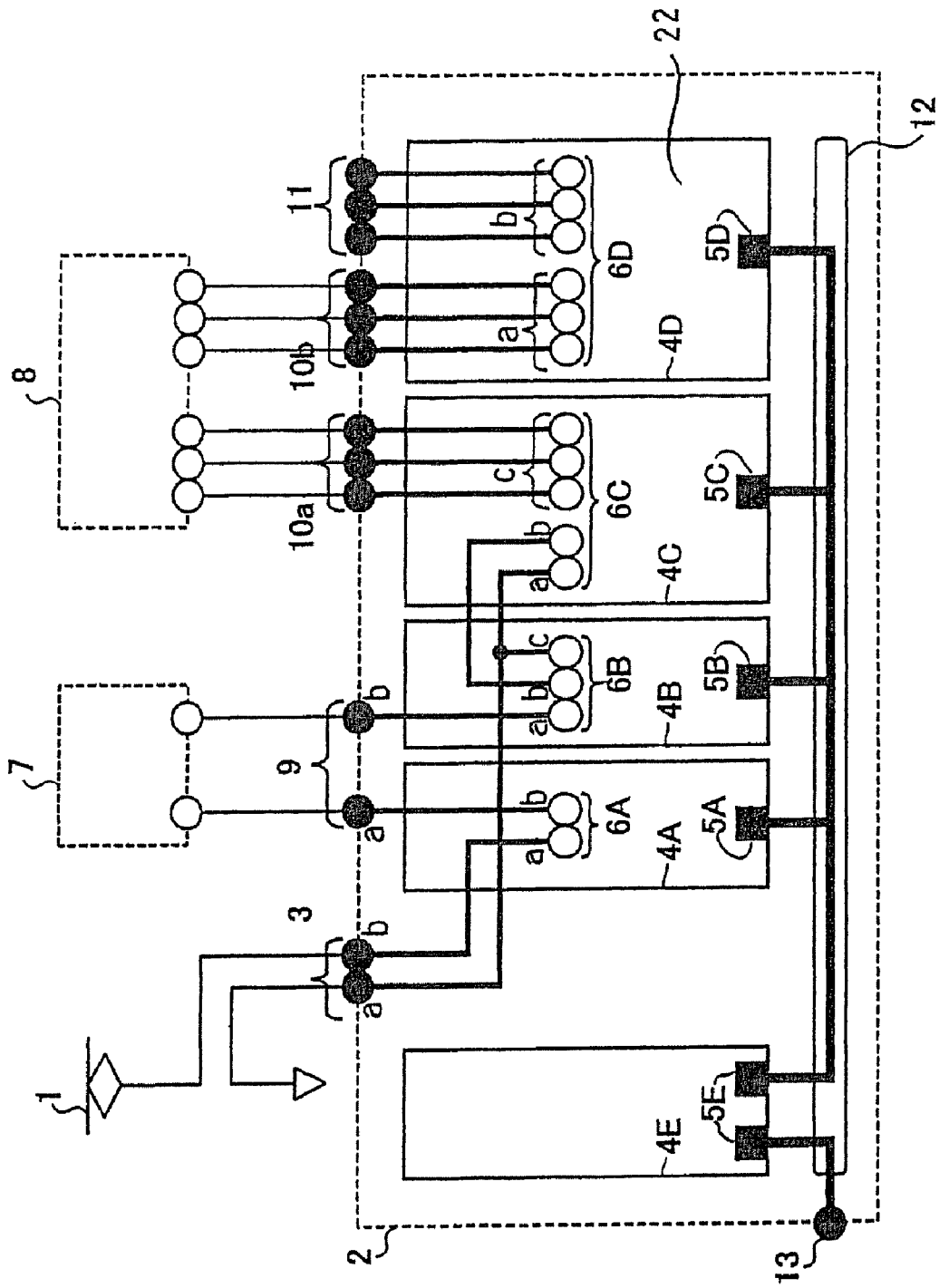
FIG. 1 is a block diagram illustrating a vehicle controller according to Embodiment 1 of the present invention.

Embodiment 1 of the present invention will be explained with reference to FIGS. 1 to 4. FIG. 1 is a block diagram illustrating a vehicle controller according to Embodiment 1.

FIG. 1 illustrates also a number of divided functional modules. At first, the configuration of the vehicle controller in FIG. 1 will be explained. Reference numeral 1 denotes an overhead line; reference numeral 2 denotes a vehicle-controller main body that is connected with the overhead line 1 (the overhead-line side and the ground side) via a group of input terminals 3. Reference characters 4A to 4E denote functional modules; the functional modules 4A to 4E include respective first interface regions 5A to 5E in each of which signal-line terminals are integrated. The functional modules 4A to 4D other than the functional module 4E include respective second interface regions 6A to 6D in each of which power-line terminals are integrated. Some terminals are designated with characters a, b, or c.

Reference numeral 7 denotes a reactor that is connected with the vehicle-controller main body 2 via a group of terminals 9. Reference numeral 8 denotes a transformer (insulated transformer) that is connected with the vehicle-controller main body 2 via a group of terminals 10a and a group of terminals 10b. Reference numeral 11 denotes a group of output terminals of the vehicle-controller main body 2. Reference numeral 12 denotes a wire bundle housing (wiring duct) that contains a bundle of wires and has a function of bundling signal lines. Reference numeral 13 denotes a group of control input terminals for transmitting information to and receiving information from an unillustrated controller that controls the vehicle controller from a higher hierarchy.

Respective main functions of the functional modules will be explained. The functional module 4A is a switch circuit having a function of performing electrical connection with and disconnection from the overhead line 1 (a DC power source, in this case). The functional module 4B has a function of performing charging and discharging of a DC voltage and a space where there can be disposed, as may be necessary, an apparatus (e.g., a core) that can suppress electromagnetic noise. The functional module 4C has a function of converting a DC voltage into an AC voltage. The functional module 4D has a function of performing connection with and disconnection from loads that are connected with the group of output terminals 11 and a space where there can be disposed, as may be necessary, an apparatus (e.g., a core) that can suppress electromagnetic noise. In general, the loads include a vehicle illumination apparatus, an air conditioner, and the like. The functional module 4E is a control circuit that has, as constituent elements, a control circuit board and a relay circuit and controls the whole vehicle controller, in accordance with a signal that is transmitted via the group of control input terminals 13 from the higher-hierarchy controller. The vehicle controller is utilized, for example, as an auxiliary power source apparatus.

Figure 2:
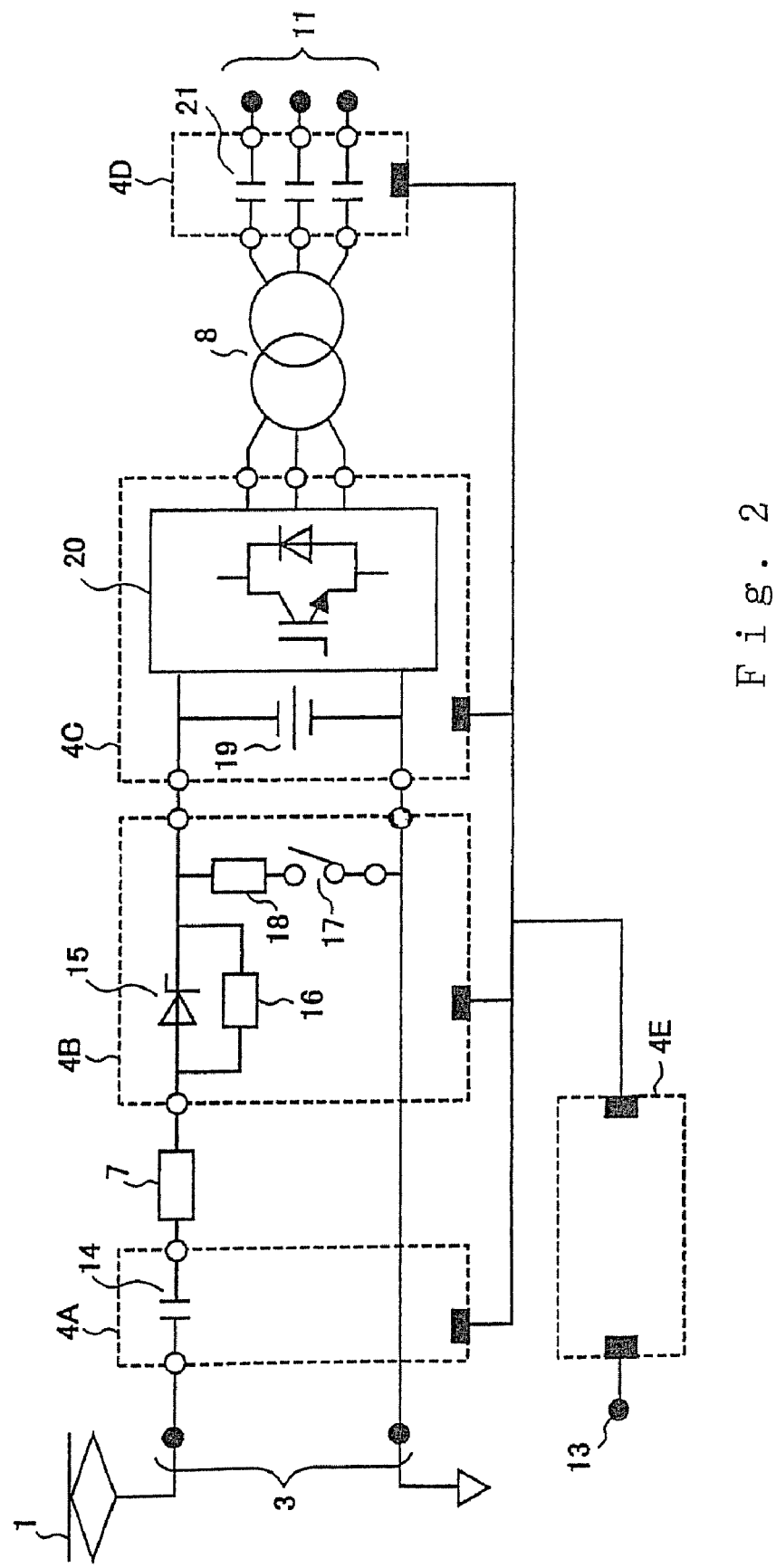
FIG. 2 is a circuit block diagram illustrating a specific example of the vehicle controller in FIG. 1.

FIG. 2 is a circuit configuration diagram for the vehicle controller illustrated in FIG. 1. An example will be illustrated in which the foregoing circuit configuration is divided in accordance with the functional definitions of the functional modules 4A to 4E. Respective components that are important as constituent elements of the functional modules 4 will be explained. For the functional module 4A, a switch 14 is an important component. The functional module 4B is a charging and discharging circuit including a reverse-blocking semiconductor switch 15, a charging resistor 16, a discharging switch 17, and a discharging resistor 18. The functional module 4C is an inverter that has a capacitor 19 and a switching circuit 20. The functional module 4D is a contactor 21 that permits and prohibits the supply of electric power to loads. In addition, in FIG. 2, for example, a voltage sensor, a current sensor, and the like are not illustrated.

In the case where, as described above, the foregoing circuit configuration is divided in accordance with the functional definitions of the functional modules 4A to 4E, an apparatus that generates electromagnetic noise most, i.e., an inverter is integrated in the functional module 4C, and the functional modules 4B and 4D can have a noise filtering function, as may be necessary. The functional modules 4 can be designed in such a way that, in the case where the functional modules 4 are arranged as illustrated in FIGS. 1 and 2, and the second interface region 6 of a given functional module 4 and the second interface region 6 of another functional module 4 are connected by means of a power line, the number of power lines for connecting the respective functional modules 4 is only one for a direct current, or the number of pairs (e.g., three-phase alternate current) is only one for multi-phase alternate current, in the case of the power lines other than power lines whose electric potentials become equal to the electric potential of the overhead line or the electric potential of the ground. In other words, the functional modules 4 can be designed in such a way that each of the functional modules 4 is single-input or single-pair-input and single-output or single-pair-output.

The foregoing designing method will be explained with reference to FIG. 1. Except for the power lines whose electric potentials become equal to the potential of the overhead line or the potential of the ground, i.e., the power lines between the overhead-line terminal 3b and the terminal 6Aa, between the ground terminal 3a and the terminal 6Bc, and between the ground terminal 3a and the terminal 6Ca, a plurality of the functional modules is single-input or single-pair-input and single-output or single-pair-output, as in the case of the power lines, i.e., the power lines between the input terminal 9b and the terminal 6Ba and between the output terminal 6Bb and the terminal 6Cb of the functional module 4B, the power lines between the input terminal 6Bb and the terminal 6Cb and between the output terminal 6Cc and the terminal 10a of the functional module 4C, and the power lines between the input terminal lob and the terminal 6Da and between the output terminal 6Db and the terminal 11 of the functional module 4D.

As in Embodiment 1, a plurality of functional modules, i.e., a functional module as a switch circuit, a functional module as a charging and discharging circuit, a functional module as an inverter, and a functional module as a contactor are connected with one another in that order, so that each of the functional modules 4B, 4C, and 4D becomes single-input or single-pair-input and single-output or single-pair-output. By configuring the vehicle auxiliary power source apparatus in such a manner as described above, an electric current inputted from the overhead line 1 flows in one direction through the functional modules arranged in the vehicle auxiliary power source apparatus, until the electric current is outputted from the vehicle auxiliary power source apparatus; therefore, the wiring path of a power line between the functional modules can be shortened. Moreover, in the case where there occurs a trouble in a certain function of the vehicle controller, the number of the functional modules 4 to be inspected or replaced can be suppressed to a limited number; thus, inspection or replacement can be performed readily and in a short time, whereby the vehicle controller can rapidly be restored.

Additionally, because the functional module 4C having an inverter that becomes a main source of electromagnetic noise is connected only with the functional module 4D via the transformer 8 and the functional module 4B and not connected with the other functional modules, the auxiliary power source apparatus can put noise sources together in a single place; therefore, the electromagnetic noise can effectively be suppressed, and the noise source can readily be located, whereby EMC measures can effectively be carried out. By connecting the functional module 4E as a control circuit in such a manner as illustrated in FIG. 1, the functional module 4E can be disposed far a way from the functional module 4C that generates electromagnetic noise.

Because, as described above, the vehicle controller utilized as an auxiliary power source apparatus is divided into a functional module having a switch circuit, a functional module having a charging and discharging circuit, a functional module having an inverter, and a functional module having a contactor, not only maintenance and inspection can be performed function by function and thereby rapidly, but also apparatuses that are main sources of electromagnetic noise are put together in a functional module having an inverter; therefore, EMC measures can effectively be carried out.

Figure 3:
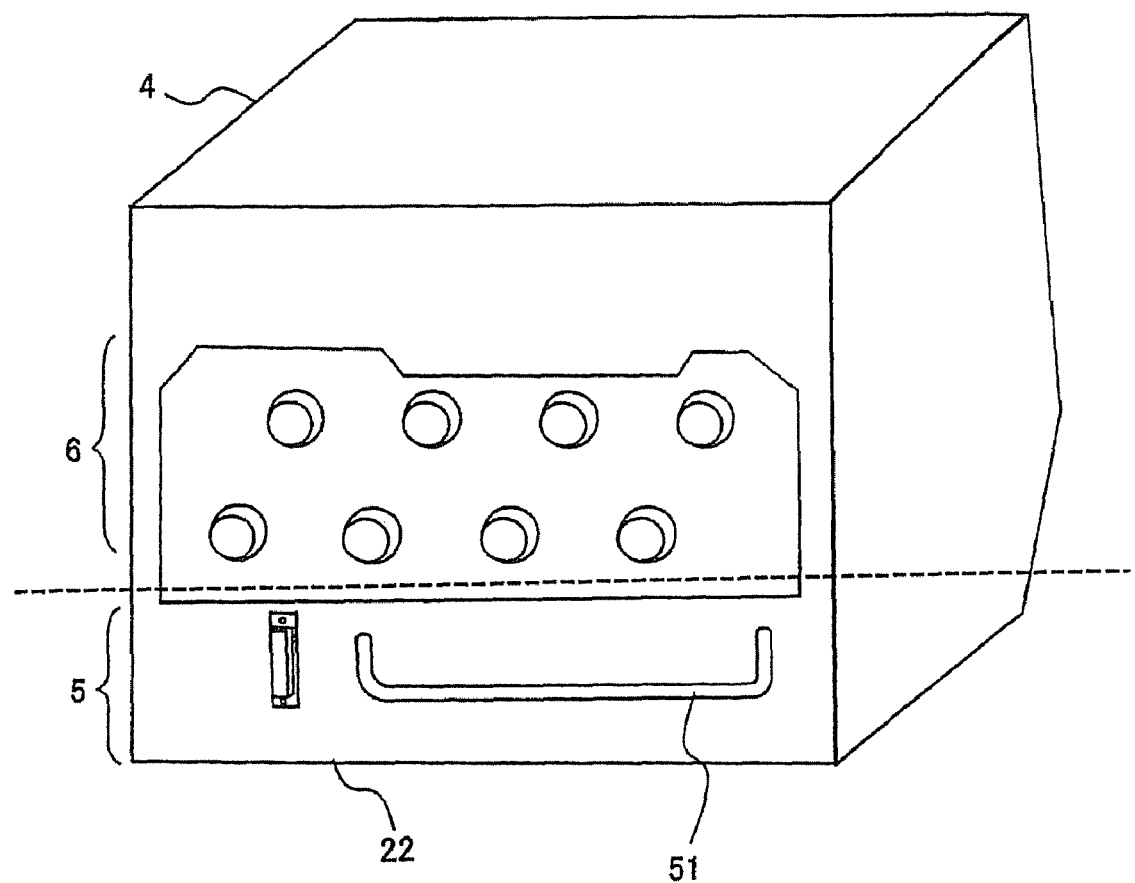
FIG. 3 is a perspective view illustrating the interface side of a functional module according to Embodiment 1.

In FIG. 3, there is illustrated an interface side 22, of a certain functional module 4, that has the first interface region 5 and the second interface region 6 at the same side. Signal-line terminals are integrated in the first interface region 5, and power-line terminals are integrated in the second interface region 6. In addition, reference numeral 51 denotes a bundle of signal lines wired in the functional module 4. Additionally, as illustrated in FIG. 3, the first interface region 5 and the second interface region 6 are physically separated at a portion indicated by the dotted line; in FIG. 3, the first interface region 5 is disposed in the vicinity of the bottom end of the functional module 4, and the second interface region 6 is disposed in the vicinity of the top end of the functional module 4. Although the top and bottom relationship may be reversed, it is required that the top and bottom relationship is maintained throughout the functional modules 4 (except for functional modules 4E, 4I, and 4J, and the functional modules 4I and 4J are described later). As illustrated in FIG. 3, all the functional modules (except for the functional module 4E) utilized in Embodiment 1 are designed in accordance with a preliminarily unified designing rule.

That is to say, in the preliminarily unified designing rule of Embodiment 1, each of the functional modules having signal-line terminals and power-line terminals has an interface side, at one side thereof, where the first interface region in which the signal-line terminals are integrated and the second interface region in which the power-line terminals are integrated are divided. In addition to that, in common with the other functional modules, each functional module has an interface side where the first interface region is disposed at one end portion and the second interface region is disposed at the other end portion. Herein, the foregoing designing method is referred to as prearrangement design.

It is not necessarily required that, in the functional module, an interface side having the first interface region and an interface side having the second interface region are situated at the same plane. For example, there may be a situation in which the first interface region and the second interface region are at the same side of the function module, but one of the regions is recessed, i.e., there exists a level difference between the first interface region and the second interface region; what matters is that the respective interface sides having the first and second interface regions are situated at one and the same side of the functional module.

It is not necessarily required that, among a plurality of functional modules, the respective interface sides are on the same plane. However, in the case where the respective first interface regions of the functional modules are on the same plane and the second interface regions of the functional modules are on the same plane, the arrangement of the interface regions is optimal. In this case, the paths of wires are simplified most, and shortening of the wire length and simplification of the power line process enable low-cost and lightweight power lines to be utilized.

Figure 4:
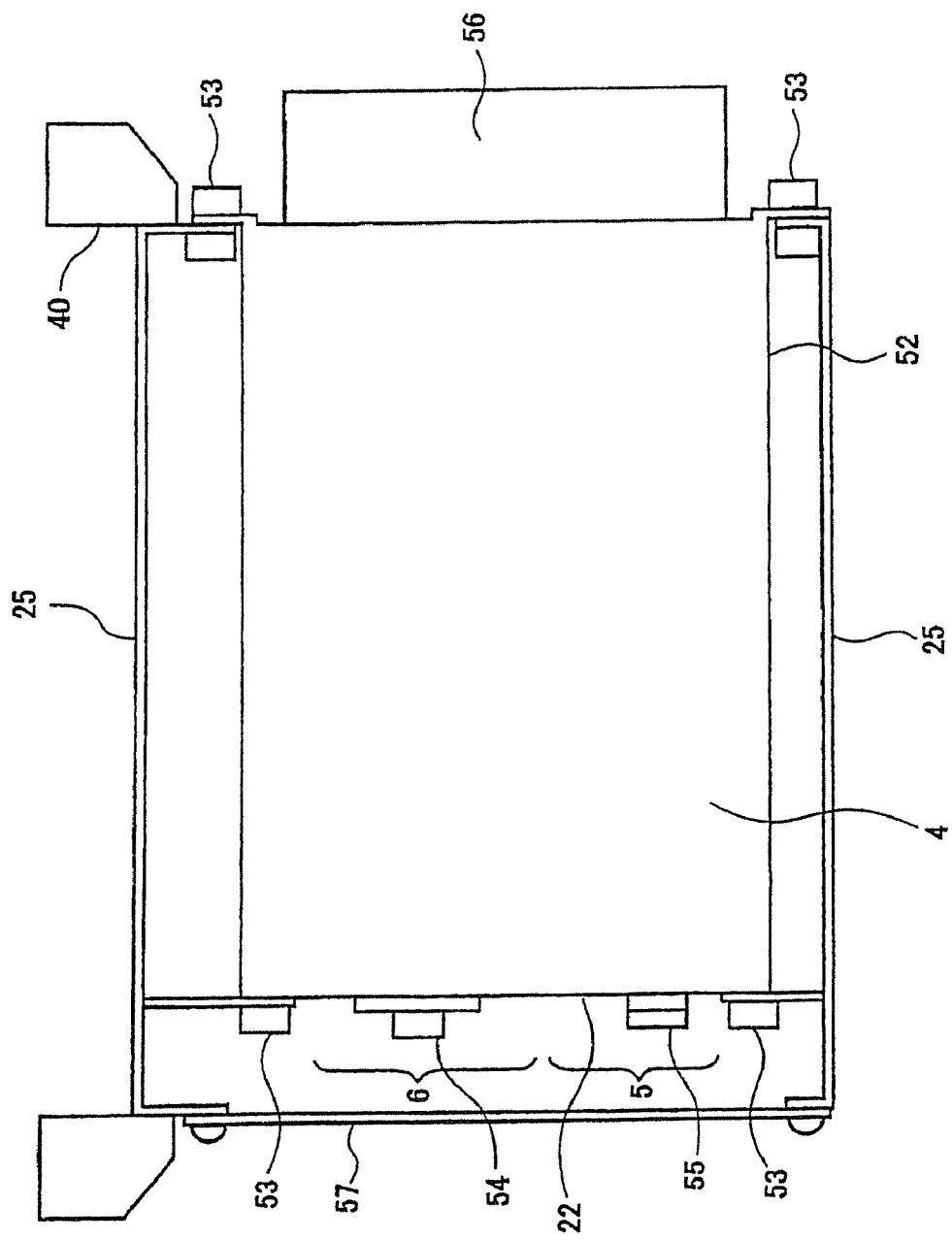
FIG. 4 is a cross-sectional view illustrating a vehicle controller according to Embodiment 1.

FIG. 4 is a cross-sectional view illustrating a vehicle controller according to Embodiment 1. FIG. 4 is a cross-sectional view of a vehicle controller in which the respective interface sides 22 of a plurality of functional modules 4 are arranged in such a way as to be adjacent to one another and to be oriented in the same direction, the respective first interface regions are arranged at one and the same end (in the vicinity of the bottom end, in FIG. 4), and the respective second interface regions are arranged at the other and the same end (in the vicinity of the top end, in FIG. 4). In this case, there is provided a desirable structure in which the respective interface sides 22 of a plurality of functional modules 4 are on one and the same plane. The functional modules 4 are placed in or enclosed by a functional-module frame 52 and fixed by means of bolts 53 to the case 25 that incorporates the functional modules, so that the functional modules 4 can be mounted and dismounted module by module.

In terms of working efficiency in mounting and dismounting of the functional modules 4, it is desirable that the size (the diameter of the bolt) of the bolt 53 is the same as that (the diameter of the bolt) of a power-line terminal bolt 54. The foregoing method allows wrenches only in one and the same size to be prepared for the power-line terminal bolt 54 and the bolt 53 when the functional modules 4 are mounted or dismounted; therefore, the working efficiency is raised. Reference numeral 55 denotes a signal-line terminal bolt or connector. Reference numeral 56 denotes a cooling fin for the functional module. Reference numeral 40 denotes a suspender for fixing the vehicle controller to a vehicle body.

In Embodiment 1, a plurality of functional modules is arranged in such a way that the respective interface sides thereof are adjacent to one another and oriented in the same direction. There may be a large or small gap between the functional modules. Because the vehicle controller is configured with a plurality of functional modules 4 each having the interface side 22 according to a preliminarily unified designing rule; therefore, the units of maintenance and inspection are integrated function by function, whereby maintenance and inspection can be rationalized. In other words, a plurality of functional modules is arranged in such a way that the interface sides in which power-line terminals or signal-line terminals are integrated are oriented in the same direction; therefore, attaching and detaching of the power lines and the signal lines that are connected to the functional modules are performed from one direction, e.g., from one side. In FIG. 4, the mounting and dismounting work are performed from an inspection cover 57 side after the inspection cover 57 is removed. Because mounting the functional module 4 to and dismounting the functional module 4 from the vehicle-controller case can be performed from a side, of the vehicle-controller case 25, where the working space is large and the working efficiency is high, the mounting and dismounting work can be rationalized. In FIG. 4, the power lines and the signal lines can be removed from one side, and the functional modules 4 can be removed from the vehicle-controller case 25 from the other sides.

Because the first interface region 5 and the second interface region 6 are arranged, for example, separately at the upper location and at the lower location, electromagnetic interference between the signal lines and the power lines can effectively be suppressed, and the path of electromagnetic noise can readily be located. That is to say, the effect of EMC measures can stably be obtained. Moreover, because the number of the power lines can be reduced, the number of working processes required for assembly, dismounting, maintenance, and inspection can be decreased.

As can be seen from FIG. 1, the functional module 4E is an extra functional module having an interface side that includes the first interface region 5E but no second interface region. The first interface region 5E at the interface side of the extra functional module 4E is disposed at the same side (in the vicinity of the bottom end, in this case) as that where the first interface regions 5A to 5D at the interface sides of the other functional modules 4A to 4D are arranged. In the functional module 4E, there are integrated components, such as a control circuit board and a relay, which affect the normal operation of the whole controller when they erroneously operate due to noise, in particular. As a result, the foregoing components can considerably be separated from the power lines, and noise measures can be provided intensively in the functional module 4E.

As described above, as is the case with the other functional modules 4A to 4D, assembly, dismounting, maintenance, and inspection can be rationalized in the functional module 4E. Because the first interface region 5E is disposed at the same side as that where the first interface regions 5A and 5D are arranged, the effect of EMC measures can stably be obtained.

Moreover, as illustrated in FIG. 3, by utilizing terminals having the same shape as the power-line terminals that configure the second interface regions 6 of a plurality of functional modules 4, the diameters of cables as power lines that connect the second interface regions 6 of the functional modules 4 one another or the width and the thickness of the conductor bus bar can be unified.

In Embodiment 1, the signal line denote, for example, wires (and the materials thereof) for transmitting and receiving control signals for the semiconductor switching devices, a power-source signal of 100 V or lower, a relay output signal, and the input and output signals of a sensor. The power line denotes wires (and the materials thereof) that are not included in the signal lines.

Embodiment 2

Figure 5:
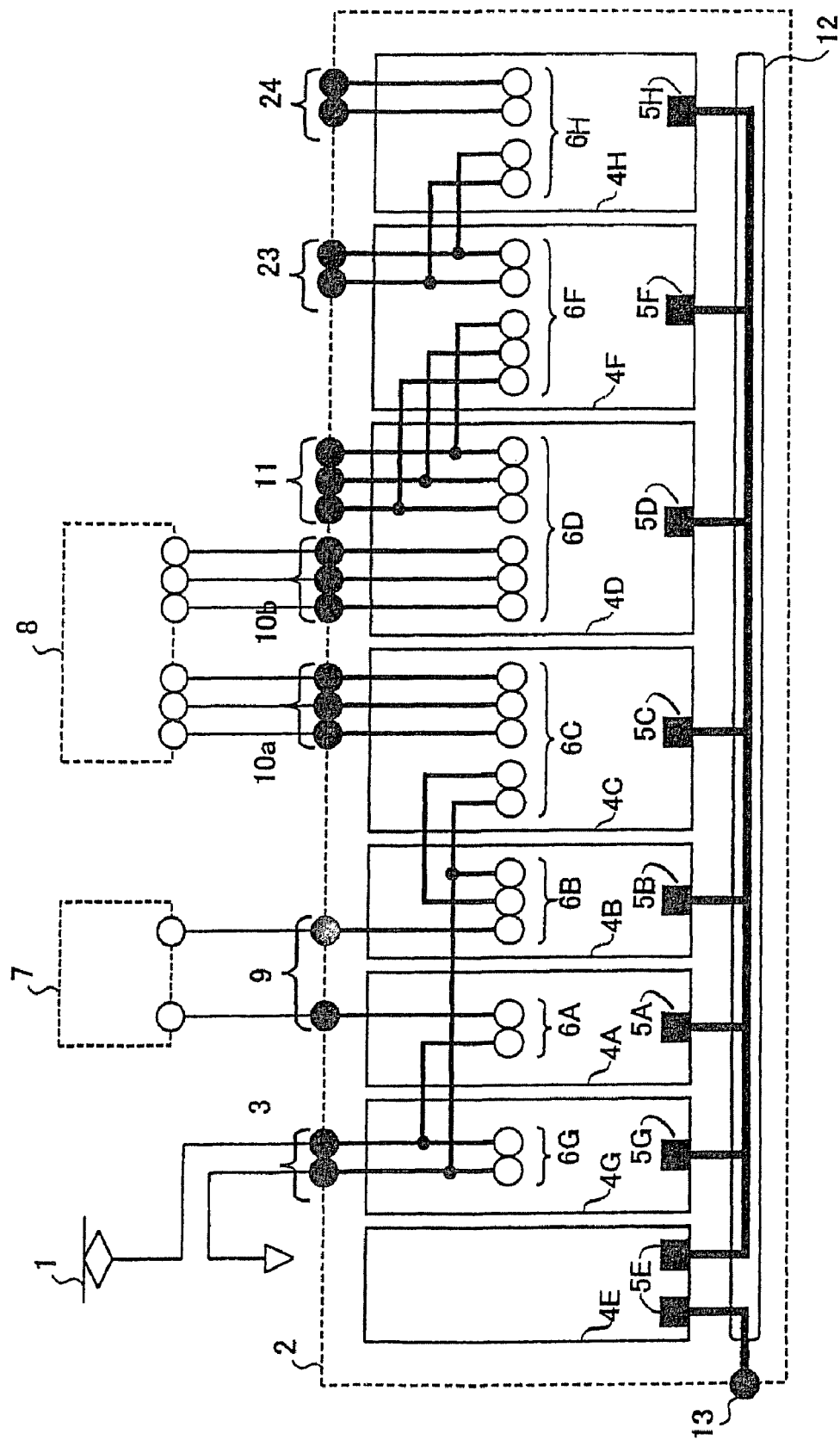
FIG. 5 is a block diagram illustrating a vehicle controller according to Embodiment 2.

FIG. 5 is a block diagram illustrating a vehicle controller according to Embodiment 2. The addition of the functional modules 4 will mainly be explained. In addition, in each of the figures, the same reference marks indicate the same or equivalent constituent elements, and explanations therefor will be omitted. The same applies hereinafter.

Here, the functional modules to be added include, for example, a functional module 4F (battery charging circuit) having a function of charging a battery mounted on a vehicle, a functional module 4G (emergency power supply circuit) having a function of stepping down a DC voltage inputted from the overhead line 1 and supplying the DC voltage to the functional module 4E, and a functional module 4H (DC step-down circuit) having a function of receiving and stepping down the output voltage of the functional module 4F and supplying the voltage to unillustrated on-vehicle apparatuses. The functional module 4G as an emergency power supply circuit functions when the battery voltage becomes lower than the rated voltage.

The circuit configuration of the functional module 4F may be arbitrary, as long as the functional module 4F is an AC to DC converter that can convert an AC voltage as the output of the functional module 4D into a DC voltage required for charging the battery. The circuit configuration of the functional module 4G may be arbitrary, as long as the functional module 4G is a DC to DC converter that can convert a high DC voltage inputted from the overhead line 1 into an appropriately low voltage that can be dealt with by the functional module 4E. The circuit configuration of the functional module 4H may be arbitrary, as long as the functional module 4H is a DC to DC converter that can step down a DC voltage outputted from the functional module 4F to a different DC voltage. In addition, in FIG. 5, reference numerals 23 and 24 denote groups of terminals; reference characters 5F, 5G, and 5H denote first interface regions; reference characters 6F, 6G, and 6H denote second interface regions.

As discussed above, even in the case where the functional modules 4F, 4G, and 4H are added, by utilizing the unified designing rule of Embodiment 1 in the same manner, the functional modules 4F, 4G, and 4H having new functions can readily be added, without changing any configurations of the interface sides 22 of the other functional modules 4. In other words, in expanding the function of the vehicle controller, the structure design can be simplified. Moreover, because the original functional modules 4 are not changed, the reliabilities of the functional modules 4 are maintained as they are.

The functional modules are designed in such a way that they are separated from one another (they do not interfere with one another) in terms of a function, so that, in performing maintenance when the controller fails, only the functional modules in trouble are inspected or replaced, without inspecting or replacing the other functional modules; thus, the controller can rapidly be restored.

Because the case and the functional modules of the vehicle controller are separated in terms of a function and can be produced independently from one another, the case and the functional modules can be produced at the same time; therefore, the lead time can be shortened. Moreover, because the case and the functional modules of the vehicle controller are separated in terms of a function and can be designed independently from one another, design change of a certain functional module does not cause design change of the other functional modules. The case of the controller and the functional modules can be designed at the same time; therefore, the designing time can be shortened. Still moreover, the case of the controller and the functional modules can be designed independently from one another; thus, design outsourcing can readily be carried out.

Figure 6:
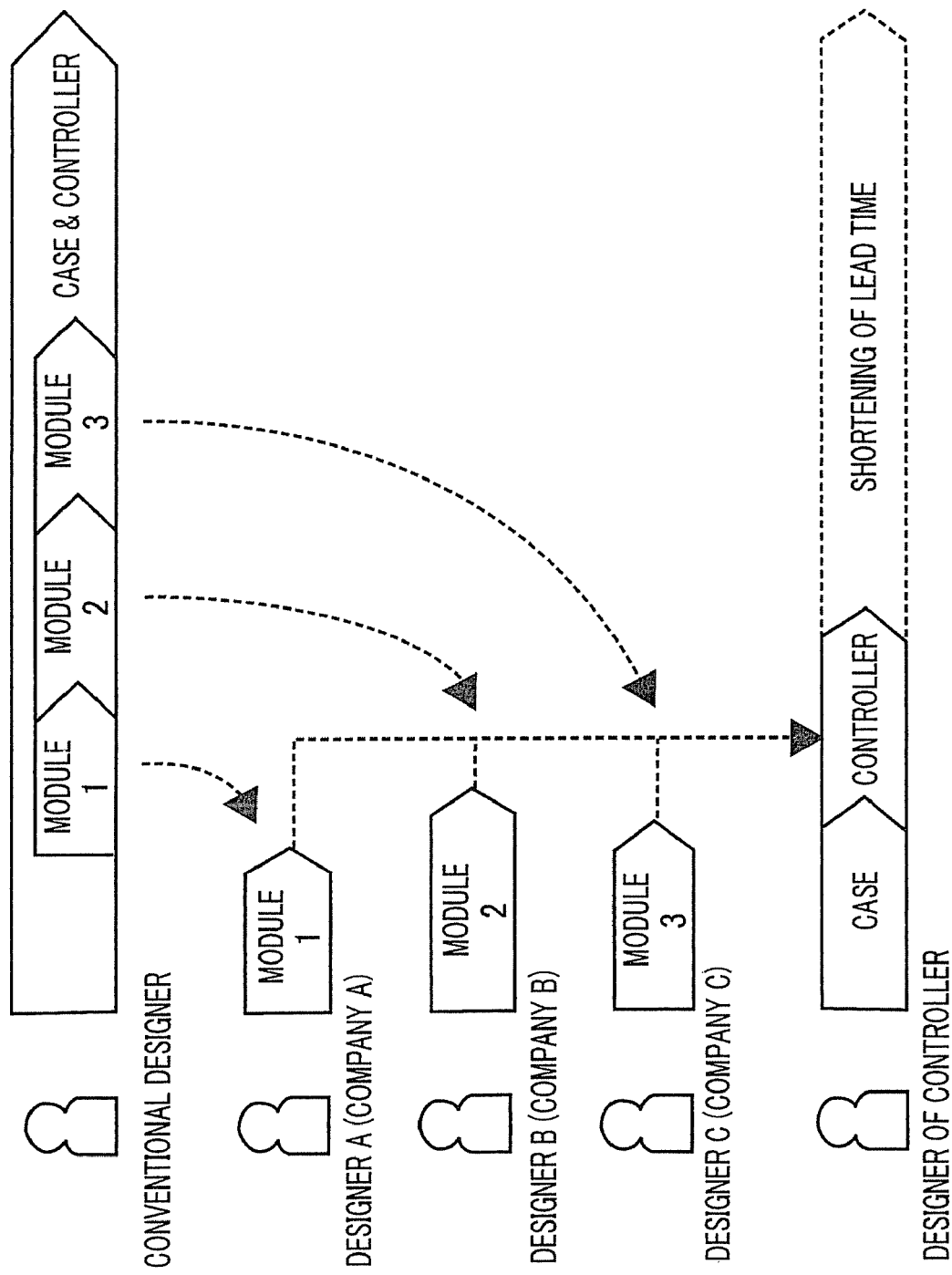
FIG. 6 is an explanatory chart representing the shortening of a lead time between the design and the production of a vehicle controller.

FIG. 6 is an explanatory chart representing the shortening of a lead time between the design and the production of a vehicle controller. To date, a functional module 1, a functional module 2, a functional module 3, and a case have been designed and manufactured in series; however, because, in Embodiment 2, the functional module 1, the functional module 2, the functional module 3, and the case can be designed and manufactured in parallel, the designing time and the production time can be shortened.

The vehicle auxiliary power source apparatus in Embodiment 1 is configured by combining functional modules that are mechanically separated from one another; therefore, when the addition, removal, and improvement of a functional module are performed in accordance with the requirement of a vehicle operating company, design change of the other functional modules is not caused. Accordingly, although, in a vehicle auxiliary power source apparatus, functions are combined in various manners depending on a product, the addition, removal, and improvement of a functional module can readily be performed in accordance with the function required for each product; therefore, various requirements can readily be dealt with, whereby design change can be rationalized. Moreover, even if a certain component fails or the production of a maintenance component is ended, only the functional module related to the component can be redesigned and replaced; thus, a risk of posing a problem for the operation of the vehicle can be suppressed.

Embodiment 3

Figure 7:
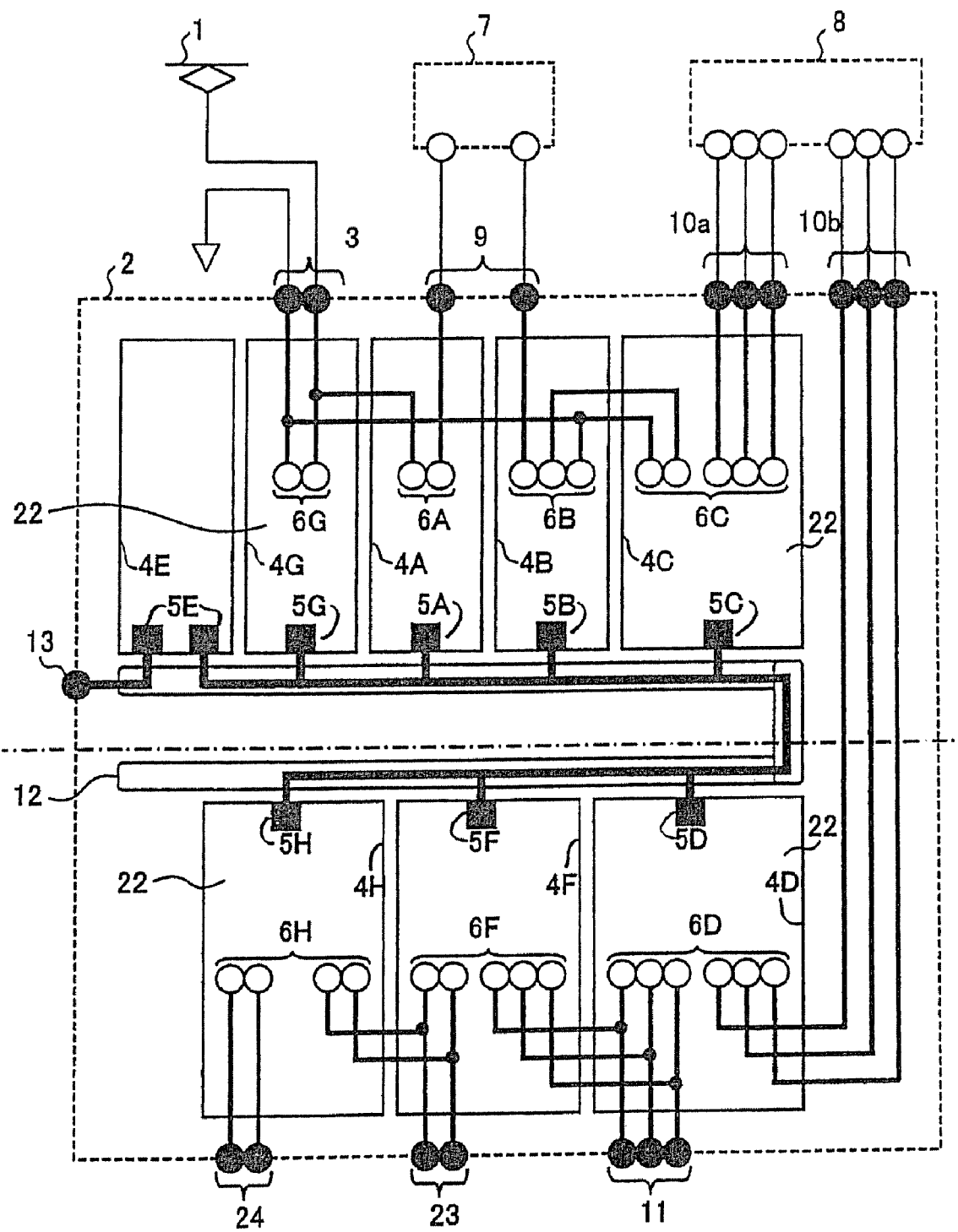
FIG. 7 is a block diagram illustrating a vehicle controller according to Embodiment 3.

FIG. 7 is a block diagram illustrating a vehicle controller according to Embodiment 3. In FIG. 5, all the functional modules 4A to 4H are arranged horizontally. In FIG. 7, the functional modules 4 are divided into two groups, and arranged in two vertical rows (or in two horizontal rows).

Each of the functional modules 4 has an interface side including a first interface region 5 where signal-line terminals are integrated at one end and a second interface region 6 where power-line terminals are integrated at the other end. A functional module 4E has an interface side including only the first interface region 5 where signal-line terminals are integrated at one end. The interface sides in the same row are arranged in such a way as to be oriented in the same direction. The interface sides are arranged in such a way that the first interface regions 5 in the same rows are situated proximally from the middle of the rows, and the second interface regions 6 in the same rows are situated distally from the middle of the rows. A wire bundle housing 12 for signal lines is disposed between the rows in order to incorporate signal lines connected to the first interface regions 5. Power lines connected to the second interface regions 6 are disposed distally from the middle of the rows.

As described above, by disposing the first interface regions 5 in the same rows proximally from the middle of the rows, the distance between the rows can be shortened because the signal lines are low-voltage. In addition, the first interface regions 5 in the same rows are situated proximally from the middle of the rows; however, in contrast to that, the second interface regions 6 in the same rows can also be situated proximally from the middle of the rows.

Because, in Embodiment 3, each of the rows of the vehicle-controller main body 2 is configured with a plurality of functional modules 4 each having the interface side 22 according to a preliminarily unified designing rule; therefore, the units of maintenance and inspection are integrated function by function and can be checked from one side, whereby the maintenance and inspection work can be rationalized. Because the first interface regions 5 in the same rows and the second interface regions 6 in the same rows are separately arranged proximally from the middle of the rows and distally from the middle of the rows, respectively, electromagnetic interference between the signal lines and the power lines can effectively be suppressed. Moreover, because the number of the power lines can be reduced, the number of working processes required for assembly, dismounting, maintenance, and inspection can be decreased.

Embodiment 4

Figure 8:
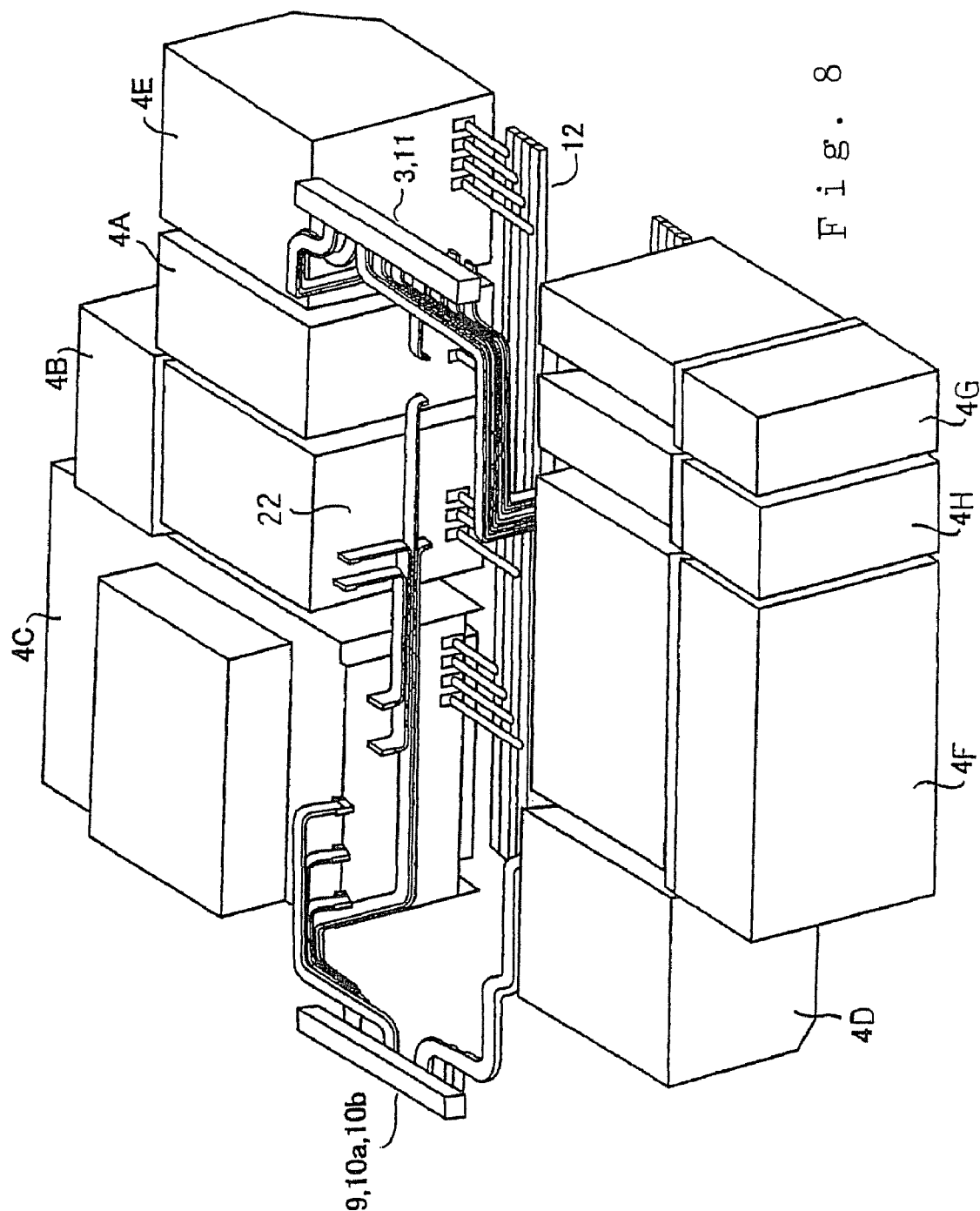
FIG. 8 is a perspective contour view illustrating another vehicle controller, according to Embodiment 4, with the case thereof removed.

FIG. 8 is a perspective contour view illustrating a vehicle controller, according to Embodiment 4, with the case thereof removed. The arrangement of the functional modules having different shapes will mainly be explained further in detail. In FIG. 8, each of the functional modules has an interface side 22 in which a first interface region where signal-line terminals are integrated and a second interface region where power-line terminals are integrated are separated; a plurality of functional modules is divided into two groups and the functional modules in the same group are arranged adjacent to one another and oriented in the same direction; one group of the interface sides and the other group of interface sides are arranged in such a way as to face each other; the interface sides are arranged in such a way that the first interface regions are situated in the vicinity of one end (in the vicinity of the bottom end, in FIG. 8), and the second interface regions are situated in the vicinity of the other end (in the vicinity of the top end, in FIG. 8). A functional module 4E has an interface side including only the first interface region where signal-line terminals are integrated; the first interface region is disposed in the vicinity of one end (in the vicinity of the bottom end, in FIG. 8). By dividing a plurality of functional modules into two groups and arranging one group of the interface sides and the other group of interface sides in such a way as to face each other, the lengths of power lines and signal lines can be shortened.

In FIG. 8, a group of input terminals 3 and a group of output terminals 11 are situated at the right portion of FIG. 8; groups of terminals 9, 10a, and lob are situated at the left portion of FIG. 8; the groups of terminals 3, 11, 9, 10a, and lob are disposed at the upper portion of the vehicle controller. A wire bundle housing 12 is disposed at the lower portion of the vehicle controller. In the case where the first interface region is situated in the vicinity of the bottom end, it is not required to suspend signal lines, and the signal lines can readily be incorporated in a wiring duct that is disposed on the bottom of the case and has a function of bundling signal lines; therefore, the method of bundling and fixing signal lines can be made simplified and low-cost. In the case where there exist a great number of signal lines or bundles of signal lines, by looking at the vehicle controller from the bottom side of the vehicle, assembly, maintenance, and inspection of the controller are readily performed.

Even in the case where functional modules 4 of various sizes are arranged, interface sides 22 are in parallel with one another. FIG. 8 illustrates a case, which is an optimal example, where, in the interface sides of one group of functional modules and the interface sides of the other group of functional modules, the interface sides 22 of a plurality of functional modules 4 arranged horizontally are on one and the same plane. In this regard however, even in the case where the interface sides 22 of some functional modules 4 are deviated, the controller does not depart from Embodiments of the present invention, as long as the interface sides 22 are in parallel with one another.

As described above, in the case where the respective first interface regions of the functional modules are on one and the same plane and the second interface regions of the functional modules are on one and the same plane, the arrangement of the interface regions is optimal. In this case, because signal lines and power lines that connect the interface regions can be arranged in one and the same plane, the paths of wires are simplified most, and shortening of the wire length and simplification of the power line process enable low-cost and lightweight power lines to be utilized.

As can be seen from FIG. 8, whatever the shape of the functional module 4 is, the basic traffic line of a worker who mechanically mounts or electrically connects the functional modules 4 can be limited to a horizontal direction; therefore, not only the difficulty level of the work can be lowered, but also the number of working processes can be reduced. Additionally, checking work for ascertaining whether or not the work has securely been performed is facilitated. For example, a worker who mounts bundles of signal lines, i.e., harnesses can carry out his work without moving his eyes up and down. Electromagnetic interference between the signal lines and the power lines can effectively be suppressed in the same manner. As described above, even in the case where the functional modules 4 differ from one another, the same effect can be obtained.

As illustrated in FIG. 8, by arranging the interface sides 22 of a plurality of functional modules 4 in such a way that they are situated in parallel with one another, there can be provided the wire-duct-shaped wire bundle housing 12 that commonly deals with each of the signal lines connected to the first interface regions 5 of the functional modules 4. As a result, the mounting state of bundles of signal lines, i.e., so-called harnesses is insusceptible to the effect of working variations and always stable; thus, electromagnetic separation, outside the functional modules 4, between the signal lines and the power lines can be secured, whereby the noise immunity can be raised.

Figure 9:
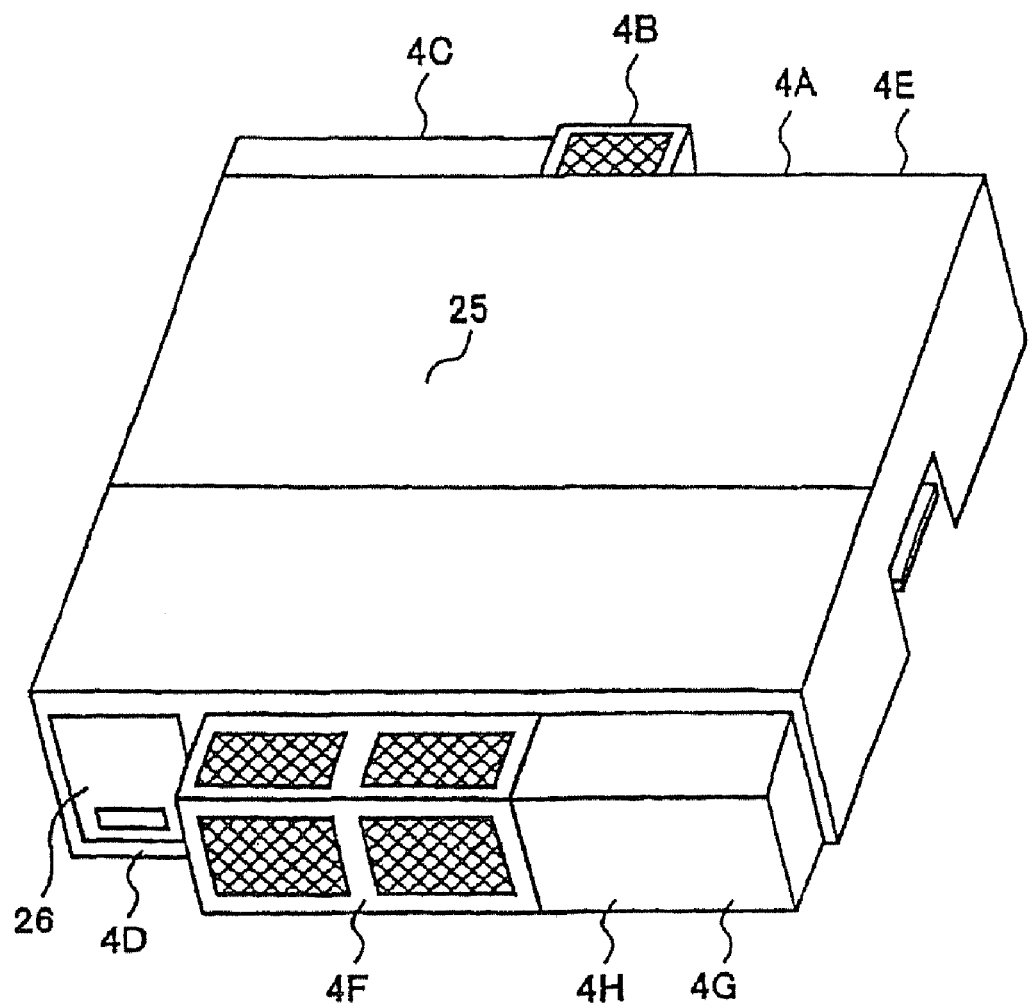
FIG. 9 is a perspective contour view illustrating a vehicle controller, according to Embodiment 4, covered with a case.

FIG. 9 is a perspective contour view illustrating a vehicle controller, to be mounted on an actual vehicle, whose functional modules 4 illustrated in FIG. 8 are arranged in a box-shaped manner and covered with a controller case 25. Reference numeral 26 denotes an inspection cover; for example, by opening the inspection cover 26, the functional module 4 to be checked can be looked at.

Embodiment 5

Figure 10:
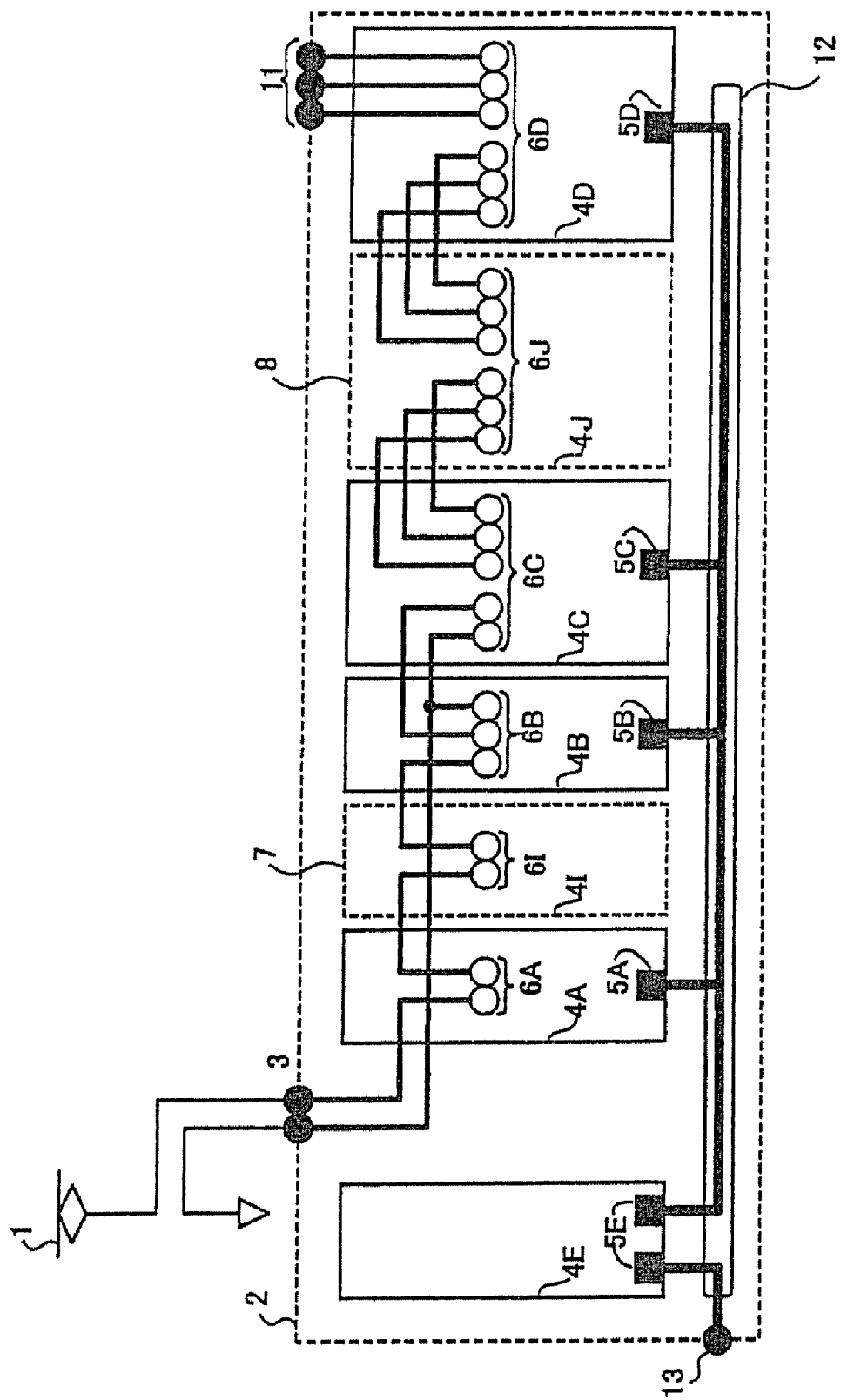
FIG. 10 is a block diagram illustrating a vehicle controller according to Embodiment 5.
Figure 11:
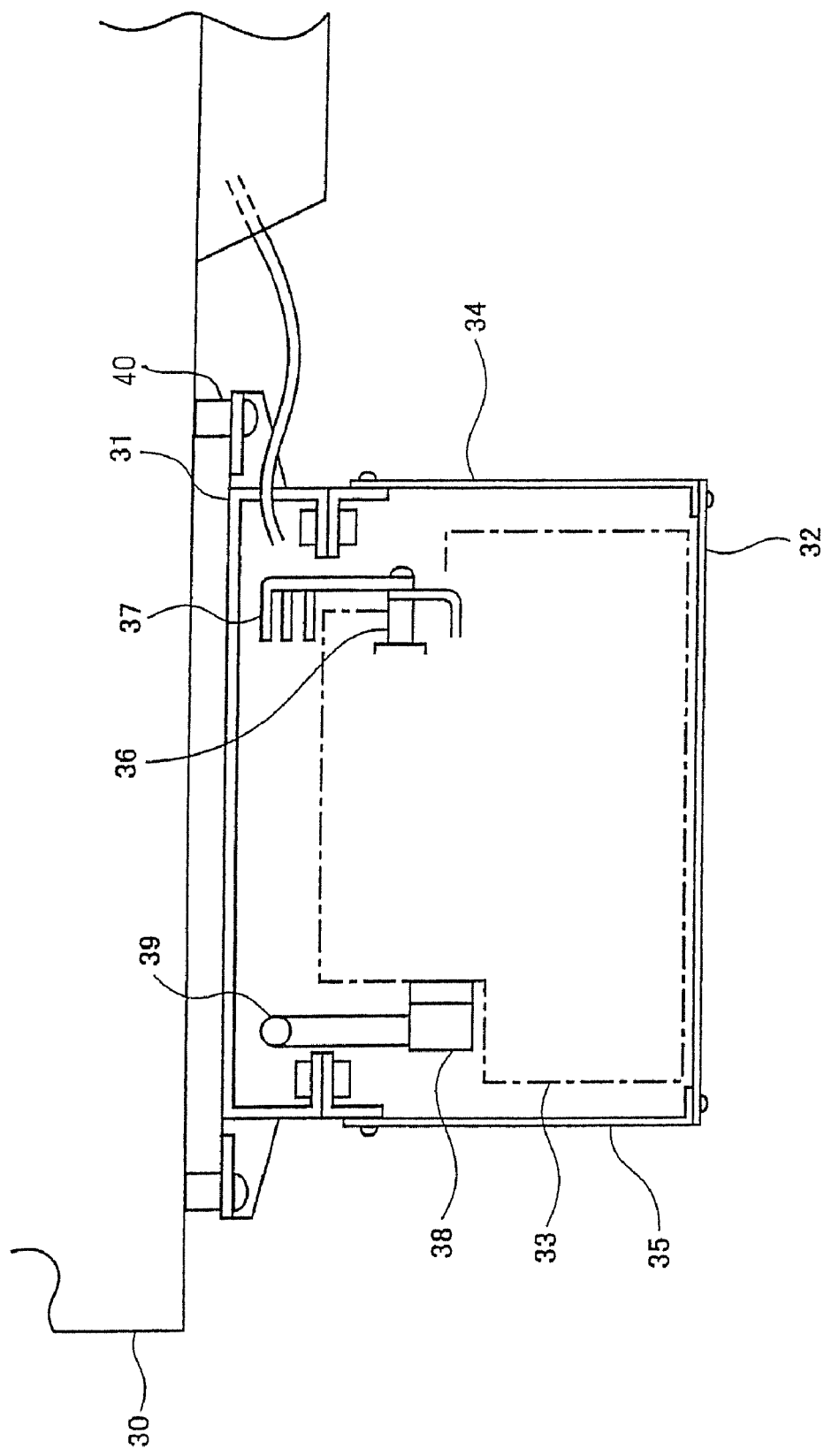
FIG. 11 is a cross-sectional view of a conventional vehicle controller.

FIG. 10 is a block diagram illustrating a vehicle controller according to Embodiment 5. In FIG. 10, there is illustrated a configuration in which the reactor 7 and the transformer 8, which are separated from the controller main body, are incorporated in a vehicle auxiliary power source apparatus 2. Even in this case, extra functional modules 4I and 4J that form the reactor 7 or the transformer 8 have interface sides including second interface regions 6I and 6J, respectively, where power-line terminals are integrated but including no first interface regions; the interface sides are arranged in the vicinity of one end (in the vicinity of the top end, in FIG. 10) in such a way that the second interface regions 6I and 6J are situated on the same plane as that on which the second interface regions 6A to 6D of the other functional modules 4A to 4D are situated. As a result, the controller can be produced without affecting the configurations and the structures of the other functional modules 4A to 4D.

As described above, as is the case with the other functional modules 4A to 4D, assembly, dismounting, maintenance, and inspection can be rationalized in the functional modules 4I and 4J. Moreover, because the second interface regions 6I and 6J are disposed at the same side as that where the second interface regions 6A and 6D are arranged, the effect of EMC measures can stably be obtained.

The invention claimed is:

1. A vehicle controller comprising:
   a plurality of functional modules; and
   signal lines and power lines connected with the functional modules,
   wherein one of the sides of the functional module is an interface side provided with signal-line terminals to which the signal lines are connected and power-line terminals to which the power lines are connected,
   wherein each of the interface sides is divided into a first interface region where signal-line terminals to which the signal lines are connected are disposed and a second interface region where power-line terminals to which the power lines are connected are disposed,
   wherein the plurality of functional modules is arranged in such a way that the respective interface sides thereof are adjacent to one another and oriented in the same direction; and the first interface regions are disposed in the vicinity of one and the same end and the second interface regions are disposed in the vicinity of the other and the same end, and
   wherein the signal lines and the power lines can be attached or detached from one side.

2. The vehicle electric-power conversion apparatus according to claim 1,
   wherein each of the functional modules has an interface side that is divided into the upper portion in which one of the first interface region and the second interface region is situated and the lower portion in which the other of the first interface region and the second interface region is situated, and
   wherein, in each of the interface sides, the first interface region is disposed in the vicinity of the bottom end or the top end thereof and the second interface region is disposed in the vicinity of the other end thereof.

3. The vehicle controller according to claim 1, wherein the plurality of functional modules is divided into a functional module having a switch circuit that performs electrical connection with and disconnection from a DC overhead line, a functional module having a charging and discharging circuit that performs charging and discharging with a DC voltage, a functional module having an inverter that converts a DC voltage into an AC voltage, and a functional module having a contactor that performs electrical connection with and disconnection from a load, and the divided functional modules are connected in order of description and utilized as an auxiliary power source apparatus.

4. The vehicle controller according to claim 1, wherein the shapes of the respective power-line connectors in the second interface regions of the plurality of functional modules are the same.

5. The vehicle controller according to claim 1, wherein the size of a bolt for the power-line connector in the second interface region of each of the functional modules is the same as that of a bolt for fixing the functional module to a case that incorporates the functional modules.

6. The vehicle controller according to claim 1, further comprising at least one functional module, as a control circuit, having an interface side that has the first interface region but no second interface region, wherein the first interface region in the interface side of said functional module is situated in the vicinity of one end the same as that in the vicinity of which the first interface regions in the interface sides of the other functional modules are situated.

7. The vehicle controller according to claim 1, wherein the first interface regions of the plurality of functional modules are situated in the vicinity of the bottom end; signal lines that connect the signal-line terminals in the first interface regions pass in a wiring duct having a function of bundling the signal lines and are held in the wiring duct; and the signal lines are arranged in the vicinity of the bottom end of the plurality of functional modules.

8. The vehicle controller according to claim 1, further comprising at least one functional module having an interface side that has the second interface region but no first interface region, wherein the second interface region in the interface side of said functional module is situated in the vicinity of one end the same as that in the vicinity of which the second interface regions in the interface sides of the other functional modules are situated.

9. The vehicle controller according to claim 1, wherein, among the plurality of functional modules, the first or the second interface region is on one and the same plane 10. A vehicle controller comprising:
a plurality of functional modules; and
signal lines and power lines connected with the functional modules,
wherein one of the sides of the functional module is an interface side provided with signal-line terminals to which the signal lines are connected and power-line terminals to which the power lines are connected,
wherein each of the interface sides is divided into a first interface region where signal-line terminals to which the signal lines are connected are disposed and a second interface region where power-line terminals to which the power lines are connected are disposed,
Wherein the plurality of functional modules is divided into two groups and arranged in two rows;
the respective interface sides thereof are arranged in such a way as to be adjacent to one another and to be oriented in the same direction; and one group of the interface sides and the other group of interface sides are arranged in such a way as to face each other,
wherein each of the interface sides of the one group and the other group are disposed in such a way that the respective first interface regions are arranged in the vicinity of one and the same end and the respective second interface regions are arranged in the vicinity of the other and the same end, and
wherein, for each of the groups, the signal lines and the power lines can be attached or detached from one side.

11. The vehicle electric-power conversion apparatus according to claim 10,
wherein each of the functional modules has an interface side that is divided into the upper portion in which one of the first interface region and the second interface region is situated and the lower portion in which the other of the first interface region and the second interface region is situated, and
wherein, in each of the interface sides, the first interface region is disposed in the vicinity of the bottom end or the top end thereof and the second interface region is disposed in the vicinity of the other end thereof.

12. The vehicle controller according to claim 10, wherein the plurality of functional modules is divided into a functional module having a switch circuit that performs electrical connection with and disconnection from a DC overhead line, a functional module having a charging and discharging circuit that performs charging and discharging with a DC voltage, a functional module having an inverter that converts a DC voltage into an AC voltage, and a functional module having a contactor that performs electrical connection with and disconnection from a load, and the divided functional modules are connected in order of description and utilized as an auxiliary power source apparatus.

13. The vehicle controller according claim 10, wherein the shapes of the respective power-line connectors in the second interface regions of the plurality of functional modules are the same.

14. The vehicle controller according to claim 10, wherein the size of a bolt for the power-line connector in the second interface region of each of the functional modules is the same as that of a bolt for fixing the functional module to a case that incorporates the functional modules.

15. The vehicle controller according to claim 10, further comprising at least one functional module, as a control circuit, having an interface side that has the first interface region but no second interface region, wherein the first interface region in the interface side of said functional module is situated in the vicinity of one end the same as that in the vicinity of which the first interface regions in the interface sides of the other functional modules are situated.

16. The vehicle controller according to claim 10, wherein the first interface regions of the plurality of functional modules are situated in the vicinity of the bottom end; signal lines that connect the signal-line terminals in the first interface regions pass in a wiring duct having a function of bundling the signal lines and are held in the wiring duct; and the signal lines are arranged in the vicinity of the bottom end of the plurality of functional modules.

17. The vehicle controller according to claim 10, further comprising at least one functional module having an interface side that has the second interface region but no first interface region, wherein the second interface region in the interface side of said functional module is situated in the vicinity of one end the same as that in the vicinity of which the second interface regions in the interface sides of the other functional modules are situated.

18. The vehicle controller according to claim 10, wherein, among the plurality of functional modules, the first or the second interface region is on one and the same plane.

19. A vehicle controller comprising:
a plurality of functional modules; and
signal lines and power lines connected with the functional modules,
wherein one of the sides of the functional module is an interface side provided with signal-line terminals to which the signal lines are connected and power-line terminals to which the power lines are connected, wherein each of the interface sides is divided into a first interface region where signal-line terminals to which the signal lines are connected are disposed and a second interface region where power-line terminals to which the power lines are connected are disposed, wherein the plurality of functional modules is divided into two groups and arranged in two rows; the respective interface sides thereof are arranged in such a way as to be adjacent to one another and to be oriented in the same direction; and one group of the interface sides and the other group of interface sides are arranged in such a way as to be oriented in the same direction, wherein, in each of the respective interface sides of the one group and the other group, one of the interface regions is disposed proximally from the middle of the rows and the other interface region is disposed distally from the middle of the rows, and wherein, for each of the groups, the signal lines and the power lines can be attached or detached from one side.

20. The vehicle controller according to claim 19, wherein the plurality of functional modules are arranged in such a way that, in each of the respective interface sides of the one group and the other group, the first interface region is disposed proximally from the middle of the rows and the second interface region is disposed distally from the middle of the rows.

21. The vehicle controller according to claim 19, wherein the plurality of functional modules is divided into a functional module having a switch circuit that performs electrical connection with and disconnection from a DC overhead line, a functional module having a charging and discharging circuit that performs charging and discharging with a DC voltage, a functional module having an inverter that converts a DC voltage into an AC voltage, and a functional module having a contactor that performs electrical connection with and disconnection from a load, and the divided functional modules are connected in order of description and utilized as an auxiliary power source apparatus.

22. The vehicle controller according claim 21, wherein, in each of the functional modules, the respective numbers or the respective pair numbers of input power lines and output power lines other than power lines whose electric potentials are equal to the electric potential of the overhead line or the ground are only one.

23. The vehicle controller according to claim 19, wherein the shapes of the respective power-line connectors in the second interface regions of the plurality of functional modules are the same.

24. The vehicle controller according to claim 19, wherein the size of a bolt for the power-line connector in the second interface region of each of the functional modules is the same as that of a bolt for fixing the functional module to a case that incorporates the functional modules.

25. The vehicle controller according to claim 19, further comprising at least one functional module, as a control circuit, having an interface side that has the first interface region but no second interface region, wherein the first interface region in the interface side of said functional module is situated in the vicinity of one end the same as that in the vicinity of which the first interface regions in the interface sides of the other functional modules are situated.

26. The vehicle controller according to claim 19, wherein the first interface regions of the plurality of functional modules are situated in the vicinity of the bottom end; signal lines that connect the signal-line terminals in the first interface regions pass in a wiring duct having a function of bundling the signal lines and are held in the wiring duct; and the signal lines are arranged in the vicinity of the bottom end of the plurality of functional modules.

27. The vehicle controller according to claim 19, further comprising at least one functional module having an interface side that has the second interface region but no first interface region, wherein the second interface region in the interface side of said functional module is situated in the vicinity of one end the same as that in the vicinity of which the second interface regions in the interface sides of the other functional modules are situated.

\* \* \* \* \*